(12) United States Patent
Hamel

(10) Patent No.: US 11,431,157 B2
(45) Date of Patent: Aug. 30, 2022

(54) ELECTRICAL OUTLET SPACING SYSTEM

(71) Applicant: Nathan Hamel, St. Louis, MO (US)

(72) Inventor: Nathan Hamel, St. Louis, MO (US)

( * ) Notice: Subject to any disclaimer, the term of this patent is extended or adjusted under 35 U.S.C. 154(b) by 302 days.

(21) Appl. No.: 16/822,891

(22) Filed: Mar. 18, 2020

(65) Prior Publication Data

US 2021/0296872 A1 Sep. 23, 2021

(51) Int. Cl.
*H02G 3/14* (2006.01)
*H02G 3/12* (2006.01)

(52) U.S. Cl.
CPC .............. *H02G 3/12* (2013.01); *H02G 3/14* (2013.01)

(58) Field of Classification Search
CPC .............. H02G 3/10; H02G 3/12; H02G 3/14
See application file for complete search history.

(56) References Cited

U.S. PATENT DOCUMENTS

| | | | |
|---|---|---|---|
| 3,468,448 A | 9/1969 | McHollan | |
| 4,964,525 A | 10/1990 | Coffey | |
| 5,623,124 A * | 4/1997 | Chien | H02G 3/14 174/53 |
| D379,622 S | 6/1997 | Lynn | |
| 6,051,785 A * | 4/2000 | Baldwin | H01H 23/04 174/67 |
| 6,070,307 A * | 6/2000 | Kawanabe | H05K 5/0247 174/53 |
| 6,552,269 B1 | 4/2003 | Conner | |
| 6,840,800 B2 | 1/2005 | Kidman | |
| 8,013,243 B2 | 9/2011 | Korcz | |
| 8,087,862 B1 | 1/2012 | Smith | |
| 8,371,465 B2 | 2/2013 | Denier | |
| 2007/0111593 A1* | 5/2007 | Kim | H02G 3/12 439/536 |
| 2008/0022543 A1* | 1/2008 | Kesler | G01C 9/26 33/645 |

\* cited by examiner

*Primary Examiner* — Stephen J Castellano

(57) ABSTRACT

An electrical outlet spacing system includes a plate that a front side, a back side and a perimeter edge. The perimeter edge includes an upper edge, a lower edge, a first lateral edge and a second lateral edge. The plate has an opening therein extending into the front side and outwardly of the back side. The opening is configured to receive a mounting tab of an electrical outlet. A pair of mounts is attached to and extends forward of the front side. The mounts are configured to engage apertures in the mounting tab. The panel is abutted against a wall surface to correctly position the electrical outlet relative to the wall surface.

5 Claims, 2 Drawing Sheets

ELECTRICAL OUTLET SPACING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to spacer devices and more particularly pertains to a new spacer device for mounting an electrical outlet forward of its mounting box to ensure that outlets are properly positioned relative to a wall in which they are located.

BRIEF SUMMARY OF THE INVENTION

An embodiment of the disclosure meets the needs presented above by generally comprising a plate that a front side, a back side and a perimeter edge. The perimeter edge includes an upper edge, a lower edge, a first lateral edge and a second lateral edge. The plate has an opening therein extending into the front side and outwardly of the back side. The opening is configured to receive a mounting tab of an electrical outlet. A pair of mounts is attached to and extends forward of the front side. The mounts are configured to engage apertures in the mounting tab. The panel is abutted against a wall surface to correctly position the electrical outlet relative to the wall surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
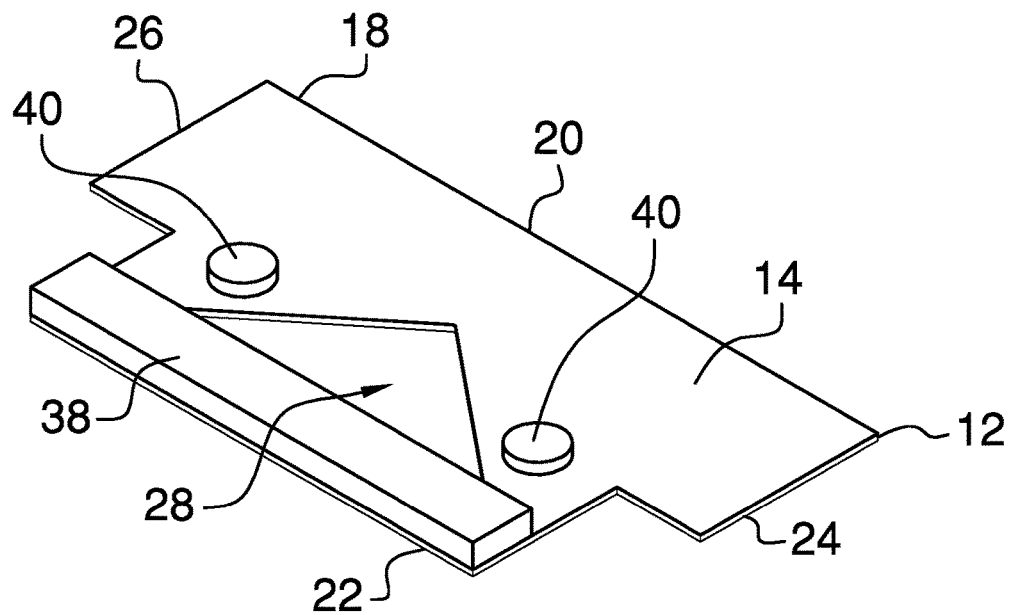
FIG. 1 is a front isometric view of an electrical outlet spacing system according to an embodiment of the disclosure.
Figure 2:
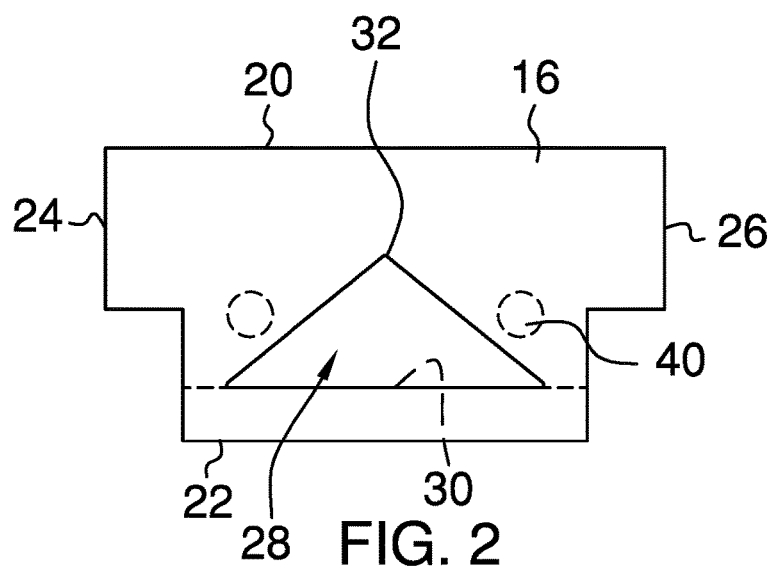
FIG. 2 is a rear view of an embodiment of the disclosure.
Figure 3:
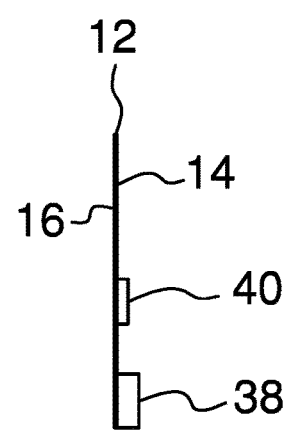
FIG. 3 is a side view of an embodiment of the disclosure.

With reference now to the drawings, and in particular to FIGS. 1 through 4 thereof, a new spacer device embodying the principles and concepts of an embodiment of the disclosure and generally designated by the reference numeral 10 will be described.

As best illustrated in FIGS. 1 through 4, the electrical outlet spacing system 10 generally comprises a plate 12 that has a front side 14, a back side 16 and a perimeter edge 18. The perimeter edge 18 includes an upper edge 20, a lower edge 22, a first lateral edge 24 and a second lateral edge 26. The plate 12 has an opening 28 therein extending into the front side 14 and outwardly of the back side 16. The opening 28 has a shape of an isosceles triangular having a base 30 orientated parallel to the lower edge 22. The base 30 is positioned between the lower edge 22 and a vertex point 32 of the opening 28. The base 30 has a length of between 1.0 inches and 1.5 inches and it should be understood that a semi-circle may be used instead of a triangular shape. The mounting tab 34 of an electrical outlet 36 is extended through the opening 28 from below and behind the plate 12 so that the mounting tab 34 is positioned on the front side 14 between the upper 20 and lower 22 edges. The plate 12 typically has a greatest length from the first lateral edge 24 to the second lateral 26 edge of between 1.75 inches and 2.25 inches. However, the length would be altered should the outlet size change. The plate 12 has a depth of between 0.10 inches and 0.20 inches. The plate 12 includes an upper portion including the upper edge 20 and a lower portion including the lower edge 22. The upper portion has a length from the first lateral edge 24 to the second lateral 26 that is greater than a length of the lower portion.

Figure 4:
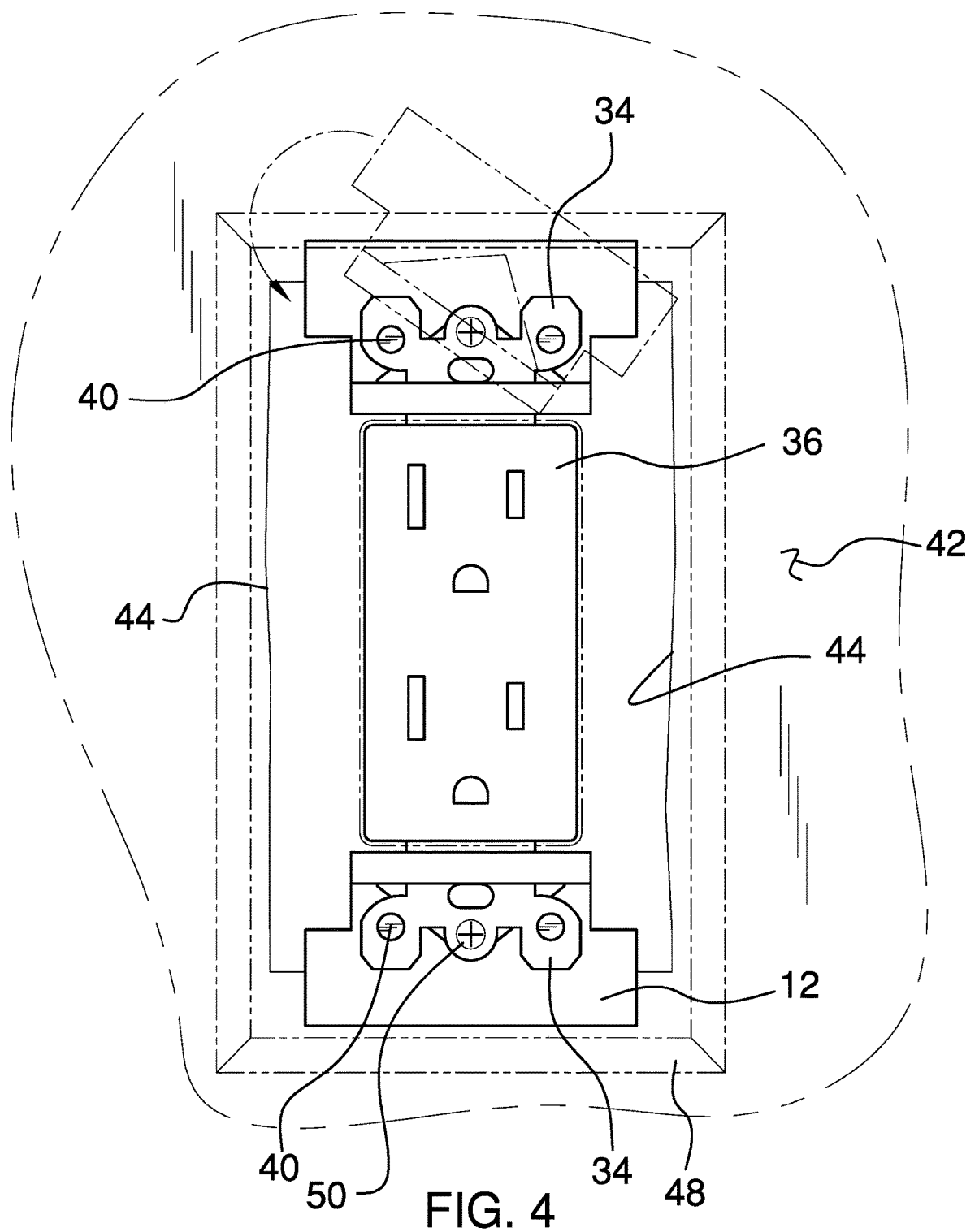
FIG. 4 is a front in-use view of an embodiment of the disclosure.

A riser 38, which functions as a stabilizing cross-piece, may be attached to and extend forward of the front side 12. The riser 38 is positioned adjacent to and extends along the lower edge 22. The riser 38 is positioned between the opening 28 and the lower edge 22 and extends forward of the mounting tab as is shown in FIG. 4 to provide strength and stability to the plate 12.

A pair of mounts 40 is provided. Each of the mounts 40 is attached to and extend forward of the front side 14. The mounts 40 are configured to engage apertures in the mounting tab 34. The mounts 40 are positioned between the lower 22 and upper 20 edges and positioned on opposite sides of the opening 28 such that each of the first 24 and second 26 lateral edges has one of the mounts 40 positioned adjacent thereto.

In use, the mounting tab 34 is extended through opening 28 so that the mounting tab 34 can engage the mounts 40. As can be seen in FIG. 4, typically a pair of assemblies 10 is used. One of the assemblies 10 is used with the lower mounting tab 340 and one with the upper mounting tab 34. The panels 12 are abutted against the outer edge of a wall 42 in which a conventional mounting box 44 of the electrical outlet 36 is positioned. The assembly 10 supports the electrical outlet 36 forward of the mounting box 44 so that the electrical outlet 36 will be positioned correctly relative to the wall 42 and a faceplate 48 positioned over the electrical outlet 36. Fasteners 50 are extended through mounting tab 34, opening and 28 into the conventional receivers of the mounting box 44. The riser 38 adds to the stabilization of the plate 12 and can abut the faceplate 48 for a more stable fitting.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An outlet spacer assembly for moving an electrical outlet outwardly of a mounting box, said outlet spacer assembly comprising:
    a plate having a front side, a back side and a perimeter edge, said perimeter edge including an upper edge, a lower edge, a first lateral edge and a second lateral edge, said plate having an opening therein extending into said front side and outwardly of said back side, said opening being configured to receive a mounting tab of an electrical outlet;
    a pair of mounts, each of said mounts being attached to and extending forward of said front side, said mounts being configured to engage apertures in the mounting tab; and
    wherein said opening has a shape of an isosceles triangular having a base orientated parallel to said lower edge, said base being positioned between said lower edge and a vertex point of said opening.

2. The outlet spacer assembly according to claim 1, wherein said mounts are positioned between said lower and upper edges, said mounts being positioned on opposite sides of said opening such that each of said first and second lateral edges has one of said mounts positioned adjacent thereto.

3. The outlet spacer assembly according to claim 1, wherein said plate includes an upper portion including said upper edge and a lower portion including said lower edge, said upper portion having a length from said first lateral edge to said second lateral edge being greater than a length of said lower portion.

4. An outlet spacer assembly for moving an electrical outlet outwardly of a mounting box, said outlet spacer assembly comprising:
    a plate having a front side, a back side and a perimeter edge, said perimeter edge including an upper edge, a lower edge, a first lateral edge and a second lateral edge, said plate having an opening therein extending into said front side and outwardly of said back side, said opening being configured to receive a mounting tab of an electrical outlet;
    a pair of mounts, each of said mounts being attached to and extending forward of said front side, said mounts being configured to engage apertures in the mounting tab; and
    a riser being attached to and extending forward of said front side, said riser being positioned adjacent to and extending along said lower edge, said riser being positioned between said opening and said lower edge.

5. An outlet spacer assembly for moving an electrical outlet outwardly of a mounting box, said outlet spacer assembly comprising:
    a plate having a front side, a back side and a perimeter edge, said perimeter edge including an upper edge, a lower edge, a first lateral edge and a second lateral edge, said plate having an opening therein extending into said front side and outwardly of said back side, said opening having a shape of an isosceles triangular having a base orientated parallel to said lower edge, said base being positioned between said lower edge and a vertex point of said opening, said opening being configured to receive a mounting tab of an electrical outlet;
    a riser being attached to and extending forward of said front side, said riser being positioned adjacent to and extending along said lower edge, said riser being positioned between said opening and said lower edge;
    a pair of mounts, each of said mounts being attached to and extending forward of said front side, said mounts being configured to engage apertures in the mounting tab, said mounts being positioned between said lower and upper edges, said mounts being positioned on opposite sides of said opening such that each of said first and second lateral edges has one of said mounts positioned adjacent thereto; and
    said plate including an upper portion including said upper edge and a lower portion including said lower edge, said upper portion having a length from said first lateral edge to said second lateral edge being greater than a length of said lower portion.

* * * * *